B. CENTER.
CONTROLLING MECHANISM FOR TRANSMISSION GEARING.
APPLICATION FILED OCT. 26, 1912.
1,054,337.
Patented Feb. 25, 1913.
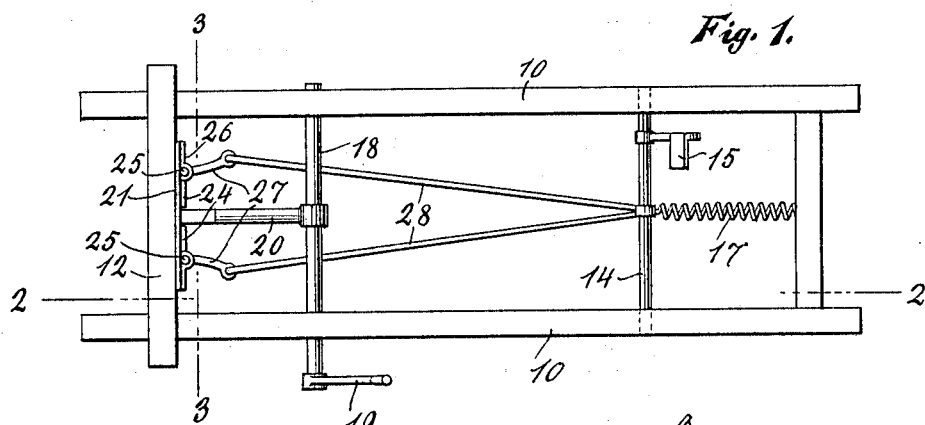
*Fig. 1.*
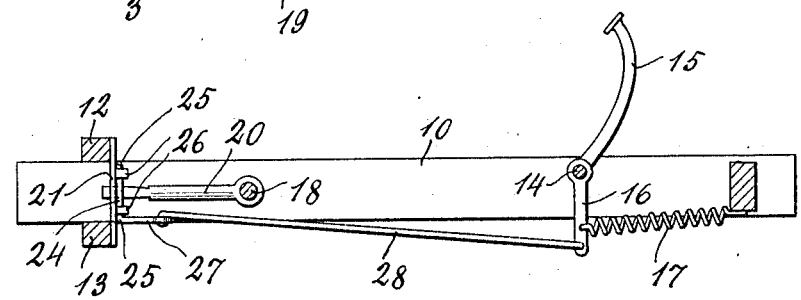
*Fig. 2.*
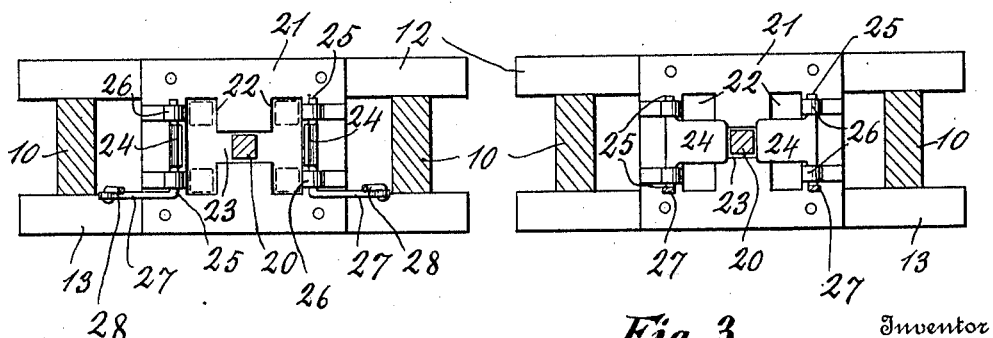
*Fig. 4.*  *Fig. 3.*
Inventor
Bert Center.
Witnesses
Attorney

UNITED STATES PATENT OFFICE.

BERT CENTER, OF WATSEKA, ILLINOIS.

CONTROLLING MECHANISM FOR TRANSMISSION-GEARING.

1,054,337. Specification of Letters Patent. Patented Feb. 25, 1913.

Application filed October 26, 1912. Serial No. 727,929.

*To all whom it may concern:*

Be it known that I, BERT CENTER, a citizen of the United States, residing at Watseka, in the county of Iroquois and State of Illinois, have invented certain new and useful Improvements in Controlling Mechanism for Transmission-Gearing, of which the following is a specification.

The controlling mechanism which is the subject of the present invention is designed more particularly for motor vehicles in which, in order to prevent damage of the transmission gearing, it is necessary to disengage the clutch of the driving shaft before operating the change-speed and reversing lever.

It is the object of the invention to provide a novel and improved locking device for the change-speed and reversing lever, and to connect said device to the clutch pedal in such a manner that the lever is held locked as long as the clutch is engaged, and not unlocked until the pedal is operated to disengage the clutch.

This object is attained by a combination and arrangement of parts to be hereinafter described and claimed, reference being had to the accompanying drawing forming a part of this specification, in which drawing—

Figure 1 is a plan view of the mechanism. Fig. 2 is a longitudinal section on the line 2—2 of Fig. 1. Fig. 3 is a cross-section on the line 3—3 of Fig. 1. Fig. 4 is a view similar to Fig. 3 showing the parts in another position.

In the drawing, 10 denotes a portion of the car frame which supports the mechanism. The construction and arrangement of this frame varies according to the make or style of the car. At one end the frame carries top and bottom cross-beams 12 and 13, respectively.

At 14 is indicated a rock-shaft which is the clutch pedal shaft of the car, said shaft being suitably connected to the clutch of the driving shaft (not shown) and being provided with a pedal 15. The shaft extends transversely of the frame 10 and is journaled therein. To the shaft is also made fast a rocker-arm 16 to which is fastened one end of a spring 17, the other end of which latter is fastened to the frame 10. The function of this spring is to keep the pedal normally in upright position.

At 18 is indicated the gear shifter shaft of the car, the same being a rock shaft which is also movable in the direction of its length, and is operatively connected to the transmission gearing (not shown), whereby reversal and a change of speed of the driving shaft is effected. An operating lever 19 is connected at one end of the shaft 18 and said shaft extends transversely of and is journaled in the frame 10. To the shaft is made fast an arm 20 the function of which will be presently described.

To the beams 12 and 13, on one side thereof, is rigidly fastened a plate 21 having two vertical slots 22 which are connected midway between their ends by a horizontal cross slot 23. The free end of the arm 20 normally seats in the slot 23 and is adapted to be shifted into either one of the vertical slots 22 upon rocking and shifting the shaft 18 by means of the hand-lever 19, whereby, through the connection with the transmission gearing a change of speed or reversal of the driving shaft is effected.

As hereinbefore stated, it is the object of the invention to prevent the operation of the hand-lever 19 before the clutch is disengaged. The mechanism whereby this is accomplished comprises the following parts: To the plate 21, on opposite sides of the slot 23, and outside the slots 22, are hinged lock-out plates 24 which swing in a horizontal plane and are adapted to be positioned across the intermediate portions of the slots 22 on opposite sides of the arm 20, when the latter is located in the slot 23. With the lock-out plates in this position, it will be evident that the arm 20 cannot be shifted into the slots 22, and the shaft 18 and its hand-lever 19 are therefore locked. The lock-out plates 24 have hinge pins 25 at one end which extend under hinge straps 26 fastened to the plate 21. The lower hinge pins have horizontal bends 27 which are connected by rods 28 to the rocker-arm 16. This connection is such that when the pedal 15 is depressed to disengage the clutch, the lock-out plates 24 swing outward and uncover the slots 22, thus releasing the arm 20 and permitting the operation of the change-speed and reversing lever 19. When the pedal is released to reëngage the clutch, the lock-out plates automatically swing back to locking position.

It will be noted that the lock-out plates 24 do not entirely cover the slots 22, but only the middle portions thereof. Thus, when the lock-nut plates are swung into release position, the arm 20 may be shifted from the slot 23 into either the upper or lower ends of either one of the slots 22, and when the lock-out plates are restored to locking position, the arm is locked in that end of the slot to which it has been shifted. The arm therefore may be shifted to five different positions and locked, said positions determining the neutral point, low speed, intermediate speed, high speed and reverse.

From the foregoing it will be evident that the change-speed and reversing lever cannot be operated until the clutch is disengaged, and therefore, all danger of injury to the transmission gearing is eliminated.

The preferred embodiment of the invention has been shown, but it will be evident that various changes in the structural details of the mechanism may be made without departure from the spirit and scope of the invention.

I claim:—

1. In a controlling mechanism, a rock shaft, a second rock-shaft, an arm extending from the second rock-shaft, a plate having slots into which the arm extends and in which slots the arm is shiftable, lock-out plates hinged to the slotted plates and adapted to bar the movement of the arm in the slots, and a connection between the lock-out plates and the first-mentioned rock-shaft.

2. In a controlling mechanism, a rock-shaft, a second rock-shaft, a slotted plate, an arm projecting from the second rock-shaft into the slots of said plate, lock-out plates hinged to the slotted plate on opposite sides of the arm, and a connection between said lock-out plates and the first-mentioned rock-shaft.

3. In a controlling mechanism, a rock-shaft, a second rock-shaft, a plate having a pair of slots which are connected intermediate their ends by a cross-slot, an arm projecting from the second rock-shaft and shiftable from the cross-slot into either end of the first-mentioned slots and vice versa, lock-out plates hinged to the slotted plate to lie across the intermediate portions of the first-mentioned slots, and a connection between said lock-out plates and the first-mentioned rock-shaft.

4. In a controlling mechanism, a rock-shaft, a second rock shaft, a slotted plate, an arm projecting from the second rock-shaft into the slots of said plate, lock-out plates hinged to the slotted plate on opposite sides of the arm, a rocker-arm on the first-mentioned rock-shaft, and a connection between the rocker-arm and the lock-out plates.

5. In a controlling mechanism, a clutch-pedal and its shaft, a change-speed and reversing lever and its shaft, an arm extending from the last-mentioned shaft, a plate having a pair of slots which are connected intermediate their ends by a cross-slot into which cross-slot the aforesaid arm extends and from which it is shiftable into either end of either of the first-mentioned slots and vice versa, lock-out plates hinged to the slotted plates to lie across the intermediate portions of the first-mentioned slots, and a connection between said lock-out plates and the first-mentioned rock-shaft.

6. In a controlling mechanism, a clutch-pedal and its shaft, a change-speed and reversing lever and its shaft, an arm extending from the last-mentioned shaft, a plate having slots into which the arm extends and in which slots the arm is shiftable, lock-out plates hinged to the slotted plate and adapted to bar the movement of the arm in the slots, and a connection between the lock-out plates and the clutch-pedal shaft.

In testimony whereof I affix my signature in presence of two witnesses.

BERT CENTER.

Witnesses:
J. F. TAKE,
MAX BUSKIRK.

Copies of this patent may be obtained for five cents each, by addressing the "Commissioner of Patents, Washington, D. C."